United States Patent [19]

Cadalzo

[11] 4,141,215
[45] Feb. 27, 1979

[54] WINDMILL MECHANISM

[76] Inventor: Concepcion Cadalzo, 80 Van Wagenen Ave., Jersey City, N.J. 07306

[21] Appl. No.: 804,713

[22] Filed: Jun. 8, 1977

[51] Int. Cl.² .................. F16D 31/02; F04B 17/02; F04B 35/02
[52] U.S. Cl. .................. 60/398; 60/477; 417/328; 417/334; 417/402; 416/171; 91/229
[58] Field of Search .............. 417/334, 402, 328, 329; 416/171; 60/398, 477; 290/44, 55; 91/229; D12/10

[56] References Cited

U.S. PATENT DOCUMENTS

| 127,942 | 6/1872 | Wheeler et al. | 91/229 |
| 2,110,393 | 3/1938 | Edwards | 60/398 X |
| 2,408,075 | 9/1946 | Kowalski et al. | 91/229 X |

FOREIGN PATENT DOCUMENTS 621275  1/1927  France ................... 417/328

Primary Examiner—Carlton R. Croyle
Assistant Examiner—Richard E. Gluck
Attorney, Agent, or Firm—Howard I. Podell

[57] ABSTRACT

A windmill in which a propeller is directly fixed to the shaft of a rotary hydraulic pump mounted on a cylinder casing rotatably mounted about a vertical axis to the top of a tower. A piston in the cylinder is recicprocated by the hydraulic fluid expelled by the pump to power a reciprocal pump at the base of the tower to which the piston is attached by a lift rod. The piston is fitted with a valve which permits the piston and attached lift rod to freely move on the downstroke through the fluid in the cylinder, with the valve closed during the upstroke of the piston to permit the pressurized fluid below the piston to raise the piston and lift rod.

2 Claims, 11 Drawing Figures

4,141,215

WINDMILL MECHANISM

BACKGROUND OF THE INVENTION

Windmill operated pumps are disclosed in U.S. Pat. Nos. 699,829; 680,039; 1,001,176; 1,397,031; 1,439,316; 1,455,950; 1,523,295; 1,574,171; 2,628,564; 2,633,921; 3,846,042; and 3,952,723, but these prior art references do not disclose the structure of the invention of the applicant.

SUMMARY OF THE INVENTION

My invention is a windmill in which a propeller is directly fixed to the shaft of a rotary hydraulic pump mounted on a cylinder casing rotatably mounted about a vertical axis to the top of a tower. A piston in the cylinder is reciprocated by the hydraulic fluid expelled by the pump to power a reciprocal pump at the base of the tower to which the piston is attached by a lift rod. The piston is fitted with a valve which permits the piston and attached lift rod to freely move on the downstroke through the fluid in the cylinder, with the valve closed during the upstroke of the piston to permit the pressurized fluid below the piston to raise the piston and lift rod.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
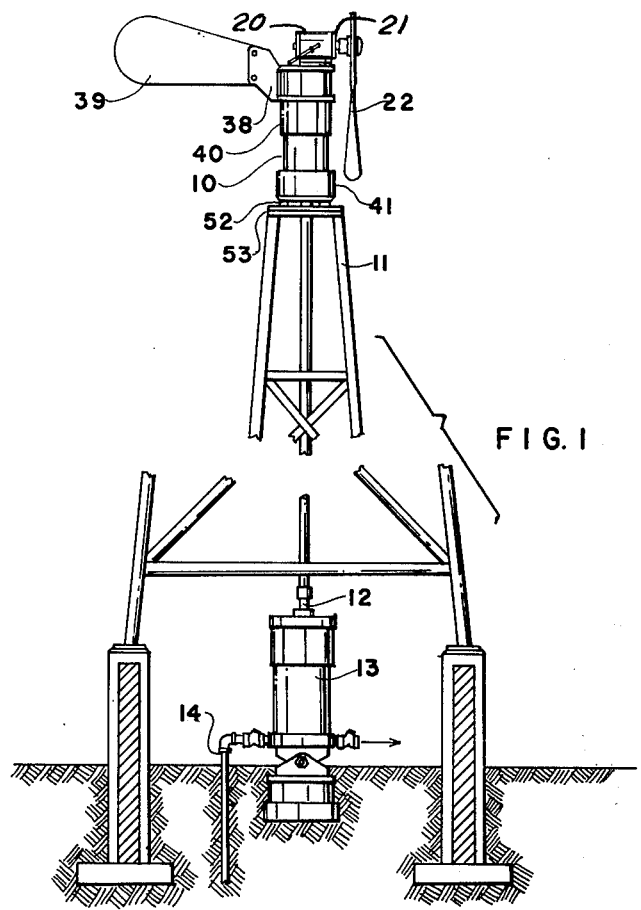
FIG. 1 is a perspective view of the invention, in use.
Figure 2:
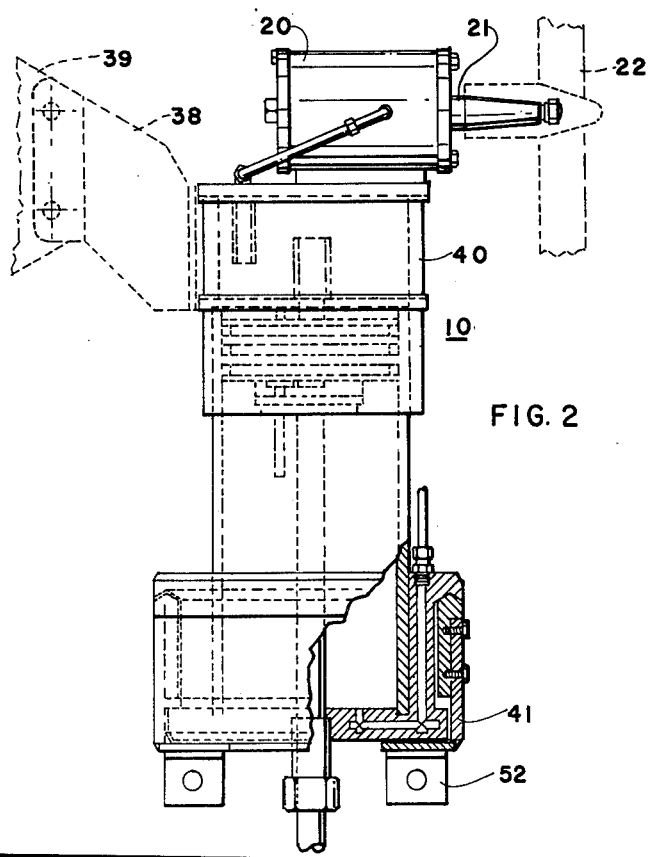
FIG. 2 is a side view of the invention.
Figure 3:
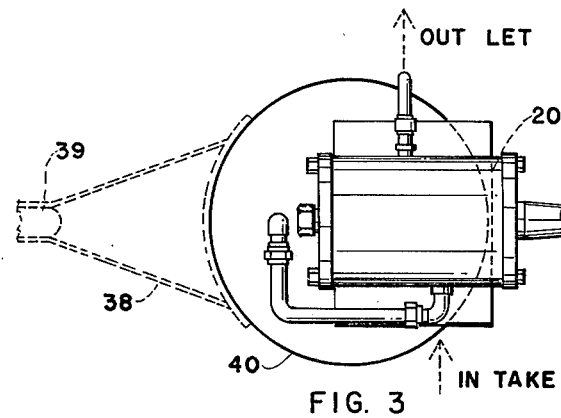
FIG. 3 is a plan view of the invention.
Figure 4:
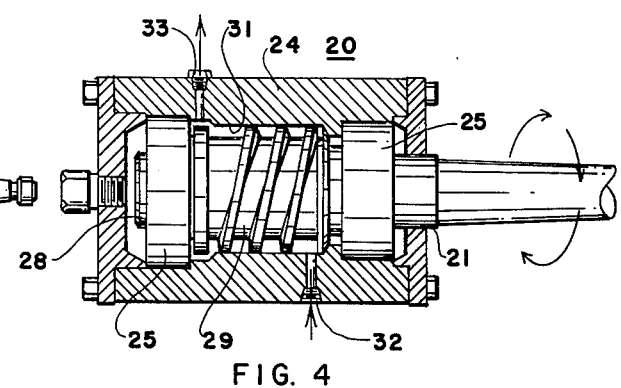
FIG. 4 is a sectional view of the hydraulic pump.

Turning now descriptively to the drawings, in which similar reference characters denote similar elements throughout the several views, FIGS. 1-2 illustrate the windmill-powered pump apparatus 10 which is mounted on top of a tower 11 to reciprocally drive a vertical shaft 12 of a reciprocal fluid pump 13 that draws oil or water from a pipe 14 leading to a well, with fluid pump 13 mounted at the base of the tower 11.

The windmill apparatus 10 includes a hydraulic pump 20 shown in FIGS. 1-4 and 10-11, the rotor 21, the rotor of which is fixed to a vertical propeller 22, with rotor 21 mounted internally in the housing 24 to spaced sealed bearings and backing against a thrust bearing 28. An upraised helical thread 29 internally formed on the rotor is in rotatable engagement with the internal cylindrical wall 31 of housing 24 to drive hydraulic fluid entering the housing chamber through inlet 32 out of outlet 33 when rotor 21 is revolved in the proper direction by propeller 22 by wind driving towards the propeller 22.

Hydraulic pump 20 is mounted on top of cylinder housing assembly 40 which is rotatably mounted to cylinder base 41, fixed to the tower top so as to freely rotate about the vertical axis in response to the steering action of the wind against the tail vane 39 fixed in a tail bracket 38 extending from cylinder housing assembly 40.

Figure 10:
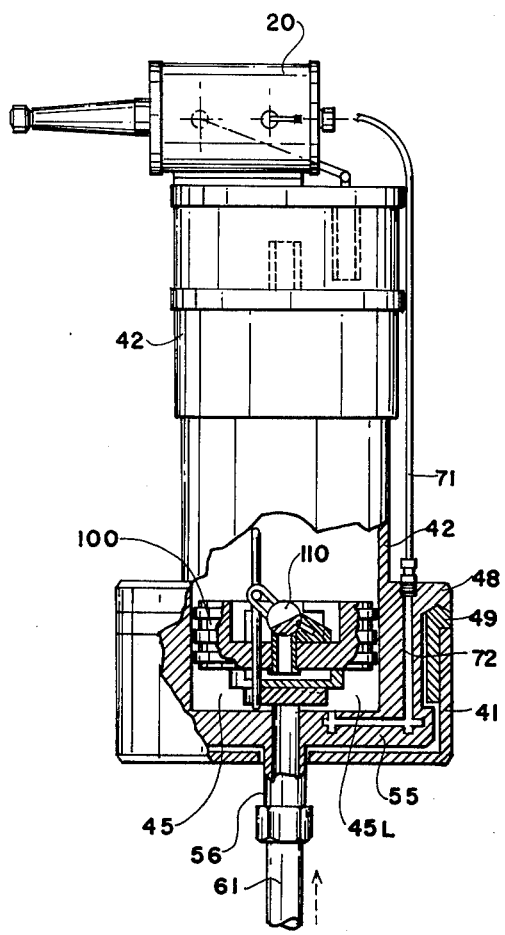
FIG. 10 is a side sectional view of the invention, with the piston beginning the upstroke.
Figure 11:
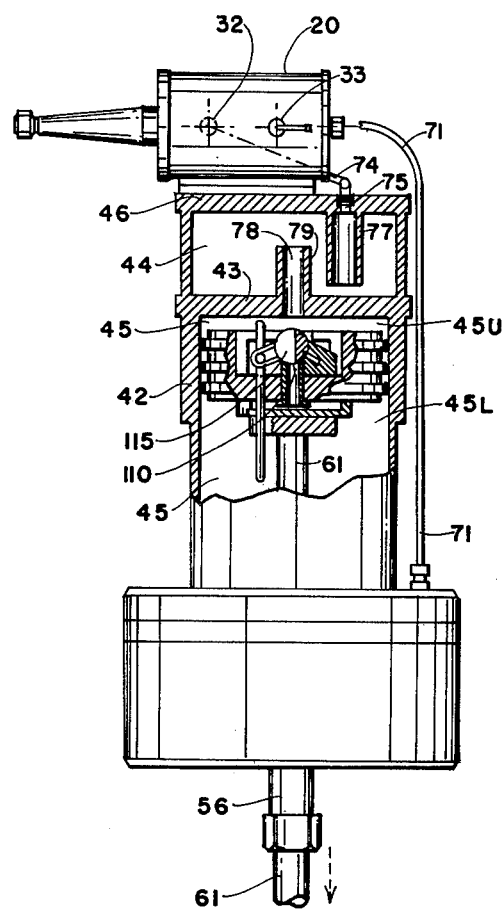
FIG. 11 is a side sectional view of the invention, with the piston beginning the down stroke.
Figure 9:
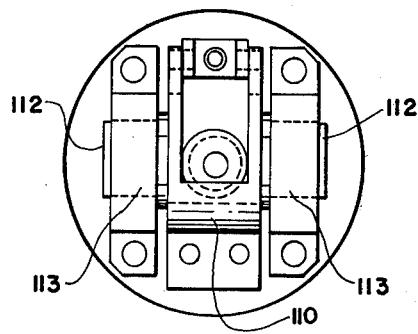
FIG. 9 is a plan view of the piston.

As shown in FIGS. 2 and 10-11, the cylinder assembly 40 includes an outer cylindrical wall 42 with a horizontal partition 43 dividing the interior into an upper reservoir chamber 44 and a lower piston chamber 45, and with wall 42 fixed to a top plate 46 enclosing the top of upper chamber 44. A shaped flange 48 extends about the exterior of cylinder wall 42 to ride on an annular bearing 49 fixed to cylinder base 41 so that cylinder wall 42 may freely rotate about the vertical axis with regard to base 41 that is fixed to lugs 52 bolted to the top 53 of tower 11. Cylinder wall 42 is fixed at its lower end to a bottom cap section 55 that encloses the bottom of the piston chamber 45, with bottom section 55 fitted with a central hole and sealing sleeve 56 through which piston shaft 61 slidably extends.

Outlet 33 of pump 20 is joined by tubing 71 to a passageway 72 in cylinder cap section 55 extending to the interior of lower piston chamber 45L, with inlet 32 joined by tubing 72 to the outlet opening 75 of top plate 46, with opening 75 joined to the interior of a vertical outlet tube 77 extending downwards into reservoir chamber 44 below the horizontal level of the top opening 78 of a vertical reservoir inlet tube 79 extending through partition 43 into upper piston chamber 45U.

Piston assembly 100, shown in FIGS. 5 and 10-11, divides piston chamber 45 into an upper and a lower chamber 45L and 45U respectively and is fixed by a threaded bracket 102 mounted below the piston body 101 to piston shaft 61. Piston body 101 is of generally circular shape and externally fitted with sealing rings 105 and lubricating rings 106. A through central opening tube 105 extends through the piston body into a centrally located recessed cavity 106 in the upper face of the piston body. Tube opening 105 is bounded by a vertical tube 107 that extends into cavity 106, with the upper face 108 of tube 107 shaped as a concave surface to engage the external cylindrical surface 109 of valve member 110, with valve member 110, when rotated about its axis X—X serving to alternately open or close the opening 105 of tube 107.

Valve member 110 is formed of a central cylindrical section 110 joined at each opposed axial end to a cylindrical plug 112, with plugs 112 each rotatably mounted in a strap bearing 113 so that the cylindrical surface 109 of section 110 slidably rests on the upper face 108 of tube 107. A central cavity 115 is removed from section 110 so that when valve member 110 is rotated to the position shown in FIG. 11, cavity 115 joins tube opening 105 with piston cavity 106, upper piston chamber 45U and through tube 107 to lower piston chamber 45L. In this valve position, the force of gravity of the weight of piston assembly 100 and attached shaft 61 carry piston assembly 100 freely downward, with hydraulic fluid freely flowing through tube opening 105.

Figure 5:
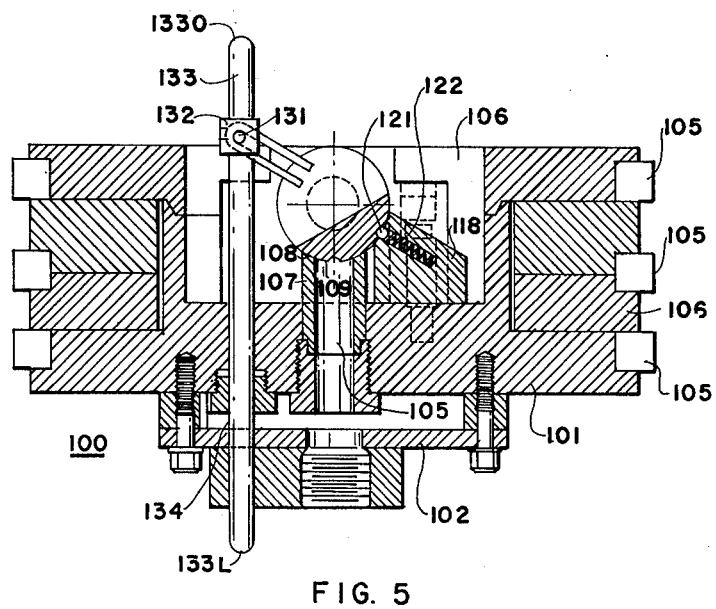
FIG. 5 is a sectional view of the piston.
Figure 8:
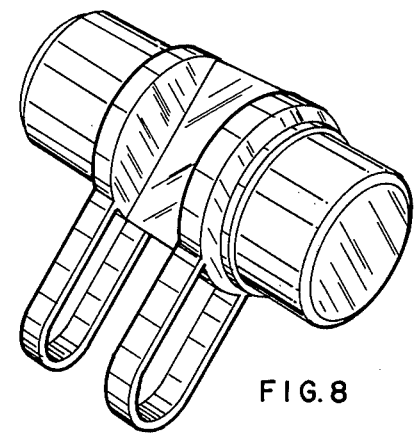
FIG. 8 is a perspective view of the piston valve.
Figure 6:
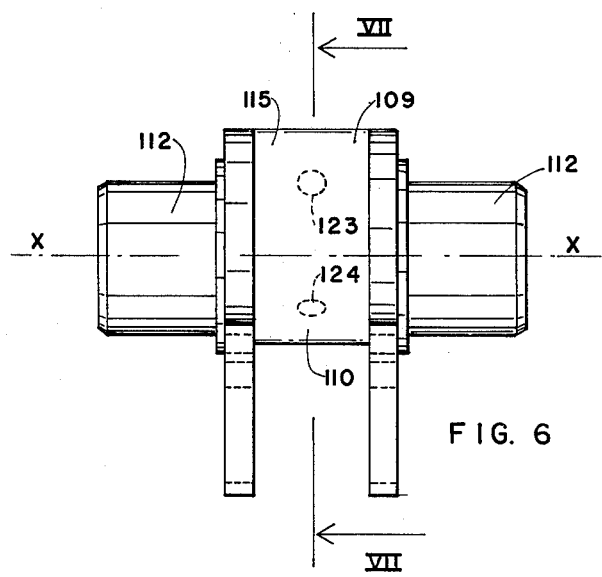
FIG. 6 is a side view of the piston valve.
Figure 7:
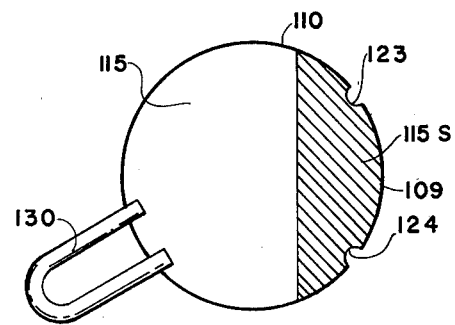
FIG. 7 is an end view of the piston valve, taken along line 7—7 of FIG. 6.

When valve member 110 is rotated about the axis X—X of lugs 112 to the position shown in FIGS. 5 and 10, opening 105 is blocked by the solid section 115's of valve 110 and fluid pressure in lower piston chamber 45L raises piston assembly 110 and shaft 61 is response to the pumping action of pump 20, driven by propeller 22.

Solid section 115S slidably bears against a retainer block 118 in which a ball detent 121 is pressed by a compression spring 122 against valve surface 109, with concavities 123 and 124 in surface 109 located to alternately latch with ball 121 in each of the two valve positions.

A V-shaped slide bar 130 extends radially from valve member 110 to slidably engage projecting lugs 131 in a collar 132 fixed to a valve rod 133 that freely extends in the vertical plane through a sealed opening 134 in piston body 101, with slide bar 130 serving to rotate valve member 110 to the alternate position when one of the opposed ends 133U or 133L strikes the upper or lower end wall of the piston chamber so as to cause valve member 110 to reverse the direction of travel of piston 100.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A windmill power generator comprising
   a hydraulic rotary pump mounted on top of a tower, with rotary wind responsive means fixed to the impeller of said pump so as to drive said pump,
   a piston and cylinder assembly mounted to said tower above the base of said tower and joined to said hydraulic pump so that fluid circulated by said pump causes the piston to move in a first direction.
   a piston shaft, mounted so as to travel in a reciprocal vertical direction in said tower, said shaft linked to the said piston so as to travel in fixed relation with said piston, with the weight of said shaft biasing the piston to travel in a second direction opposed to said first direction a fluid reservoir being mounted between the hydraulic pump and the cylinder assembly, with said reservoir being in fluid communication with a chamber of the cylinder assembly and a port of the pump,
   the reservoir being fitted with an inlet pipe and an outlet pipe with the outlet pipe of the reservoir joined to the intake port of the rotary pump, and with the chamber of the cylinder assembly, from which fluid is expelled when the piston travels in the said first direction, joined to the inlet pipe of the reservoir,
   in which both inlet and outlet pipes of the reservoir extend into the interior of the reservoir, with the opening inside of the reservoir of the inlet pipe being at a higher elevation than the opening inside the reservoir of the outlet pipe.

2. The combination as recited in claim 1 in which the hydraulic pump is fixed to the cylinder of the cylinder assembly, with said cylinder rotatably mounted about a vertical axis to a fixed top-section of the tower.

* * * * *